Oct. 22, 1935.      A. LEIB      2,017,908
DIRECTION FINDING APPARATUS
Filed May 16, 1930      2 Sheets-Sheet 1
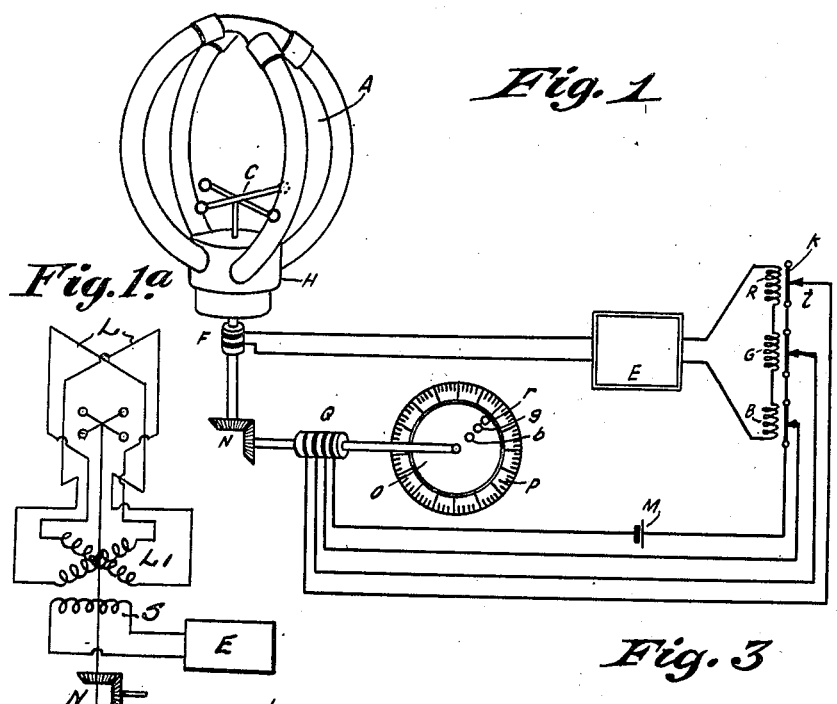
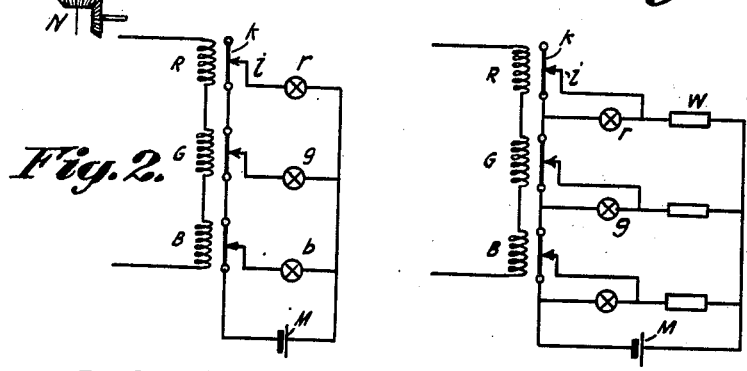
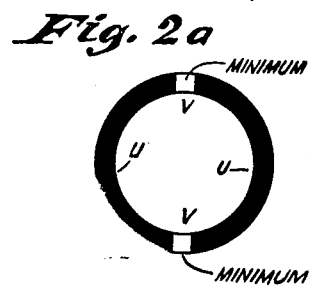
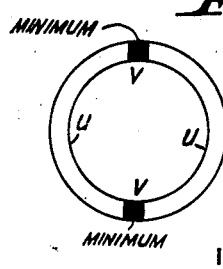
INVENTOR
AUGUST LEIB.
BY H. S. Grover
ATTORNEY Oct. 22, 1935.  A. LEIB  2,017,908

DIRECTION FINDING APPARATUS

Filed May 16, 1930  2 Sheets-Sheet 2

INVENTOR
AUGUST LEIB
BY
ATTORNEY

Patented Oct. 22, 1935

2,017,908

UNITED STATES PATENT OFFICE 2,017,908

DIRECTION FINDING APPARATUS

August Leib, Berlin, Germany, assignor to Telefunken Gesellschaft für Drahtlose Telegraphie m. b. H., Berlin, Germany, a corporation of Germany Application May 16, 1930, Serial No. 452,838
In Germany July 26, 1929

7 Claims. (Cl. 250—11)

The invention is concerned with an automatic direction-finder apparatus in which an optical indicator device rotates in synchronism with the coil antenna or with the direction-finder coil of a goniometer, the position of the direction-finder element characterizing the direction or correct bearing, the latter being indicated by the flashing-up or extinction, meaning either minimum or maximum signal strength, according to the circuit arrangements that have been chosen.

According to the invention, a plurality of optical indicators such as glow-lamps, luminescent tubes, or the like, is mounted on a joint revolving indicator or signal device. These indicators are energized in response to signals from a joint directional antenna system, direction-finder coil or goniometer search coil. Suitable resonance circuits or resonance relays are provided, each of such together with an indicator device controlled thereby is coordinated to a definite radio beacon from which bearings are to be taken. If all of the indicators are readily distinguishable by a definite mark or characteristic such as different colors, this constitutes an excellent and simple means of simultaneously taking bearings from different separately located radio beacons, and in this manner it is directly feasible to obtain an idea respecting the position of the craft. Of course, it is also possible in this scheme to take bearings selectively from certain radio beacons by disconnecting such indicators as are not desired.

A better understanding of the invention will be had by a perusal of the following detailed description thereof in which reference is made to the figures in the annexed drawings, in which, Figure 1 shows an embodiment of the invention:

Figure 1a shows diagrammatically the circuits of the radiogoniometer, the search coil and its connection with the receiver;

Figure 2 shows in detail a portion of the circuit of the arrangement of Figure 1;

Figure 2a shows the signal indications derived from the device of Figure 1;

Figure 3 shows a modification of the circuit of Figure 2;

Figure 3a shows the signal indications derived from the modified circuit of Figure 3; while.

Figure 6:
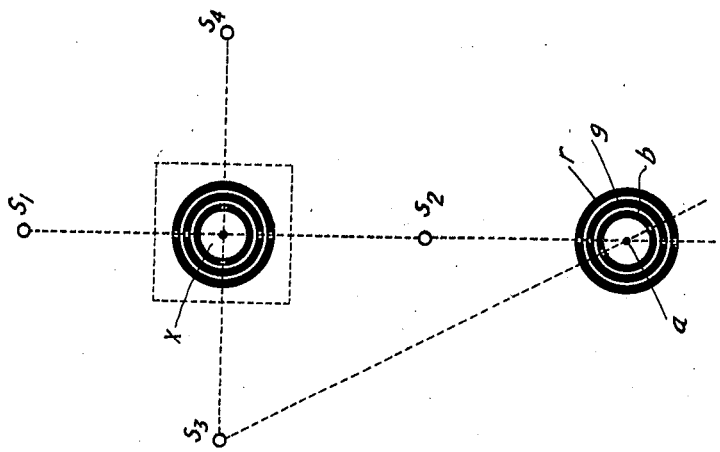
Figures 4, 5, and 6 illustrate different modes of operating the novel direction finder.

Figures 1 and 1a show an embodiment of the apparatus by way of example. A is a weatherproof cross-frame aerial, the windings L of which are connected in a well known manner with two goniometer coils $L_1$ which in the instance here shown are built into the base casing H of the frame in a manner to safeguard them from the inclemencies of the weather. The search coil S of the goniometer in the present case is driven by wind actuated vanes C; a scheme which is particularly suited for aircraft. It will be understood, of course, that also some other drive of suitable sort such as by an electric or gasoline motor may be used instead. The high frequency electrical oscillations induced in the search coil S of the goniometer are modulated by different low frequencies, most conveniently inside the audible range. Whenever bearings are to be taken from several beacons the signals from said beacons are fed to the receiver E by way of slip rings F where they are reinforced or amplified and then converted by an audion into low-frequency oscillations according to the particular modulating frequencies impressed on the carrier frequencies received. From the output circuit of the receiver, these oscillations are fed to a number of resonant relays either directly or, if necessary, after further amplification.

Each one of these resonant relays is tuned to a distinct frequency, say for example, R is tuned to 500, G to 700 and B to 900 cycles per second. These resonant relays may be, for instance, along the same lines as the vibratory relays known in the prior art. In relays of this kind the elastic or spring contacts $i$ under normal condition, i. e., in the state of rest, are constantly associated with the dittons or diaphragms $k$ tuned to respond to a definite frequency. If these latter are excited by resonant electromagnetic oscillations of the corresponding relay winding, the spring contacts $i$ are temporarily thrown off with the result that the mean contact resistance between $i$ and $k$ becomes very high. These relay contacts are connected together by way of slip rings Q with glow-lamps $r$, $g$, $b$, supplied from a battery M, said lamps being radially mounted upon a support O having the form of a disk, arm or bracket, and driven in synchronism with the goniometer coil by means of the bevel-wheel gearing N and associated shafting as shown in Figure 1.

If the electrical connections have been so established that the glow-lamps $r$, $g$, $b$, are in series with the relay contacts actuating and controlling them as shown in Figure 2, each of said lamps will flash up whenever the corresponding relay is deenergized. In operation this results in a luminous picture as shown in Figure 2a.

The light segments $v$, $v$, of the lamp trajectory are located in the neighborhood of the position indicating minimum signal strength. On the other segments u, u of the lamp path during rotation the lamp is dark upon reception, because the corresponding relay is then energized and its contact broken. When the radio beacon stops sending the segments u, u, will flash up also. When the beacon sends out Morse signals, the segments v, v, remain permanently light, the segments u, u, become extinguished, that is, are dark when dashes and dots are transmitted, while they glow or become light during spaces. Hence, the signal is reproduced negatively.

But if the circuit diagram as illustrated in Figure 3 is chosen, where, the control contacts are connected in parallel to the glow-lamps, in which case series resistances W are required, each of the lamps will flash up upon its relay being energized, while it goes out whenever the relay is de-energized. The luminous picture of the lamp trajectory as shown in Figure 3a is in this case the reverse of what it was in the preceding circuit scheme. The segments v, v, for the minimum signal strength remain permanently dark. The segments u, u, are lit when energy is being received, and the Morse-code signals are here reproduced in a positive manner.

In order that the various lamps may be more easily distinguished it is suggested to choose different colors; for instance lamp r could be made red, lamp g green, lamp b blue, and so on.

The direction-finding position of the glow-lamps may be read most suitably on the fixed direction-finder scale or dial p.

While for the purpose of illustration I have shown three resonate circuits, three lamps and associated circuits it will be understood that more or less lamps may be used as conditions require without departing from the spirit of the invention.

It is readily possible to associate with one and the same goniometer a plurality of receivers comprising each several resonant circuits or resonant relays. In other words, bearings can be taken simultaneously from a great number of radio beacons operating on different carrier waves and different modulation frequencies, and to each of these a separate optical indicator may be coordinated. Since it is an easy matter to connect and disconnect any desired number of indicators, the radio beacons can be received simultaneously or separately.

Figure 4:
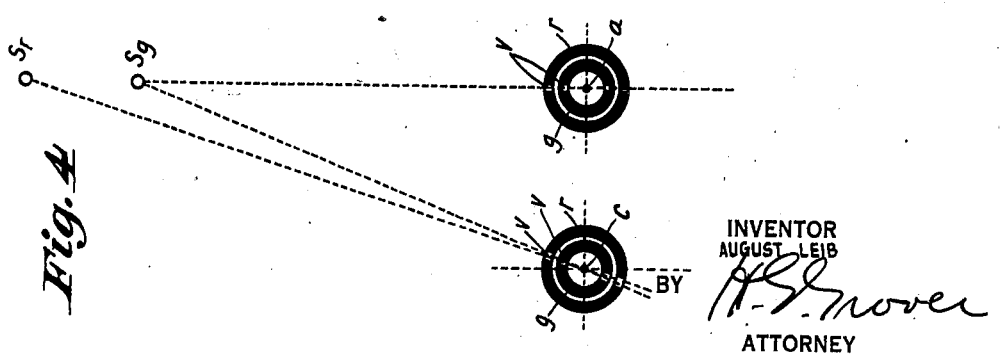

Figure 4 illustrates a modification of my invention. Sr is a radio beacon operating on, for example, a wave of 1000 meters and a modulation frequency of 500 cycles per second. In this case let it be assumed that the carrier wave propagated by radio beacon Sg is also 1000 meters but that the modulator frequency is 700 cycles per second. In the direction-finder the receiver is tuned to a carrier wave of 1000 meters, the resonant relay R is tuned to 500 cycles per second and resonant relay G to 700 cycles per second. Hence, the red lamp r is coordinated to the radio beacon Sr and the green lamp g to the beacon Sg. Now, if the craft is located at point a on a line connecting Sr and Sg, then the corresponding signal strength minima coincide for both radio beacons a fact which can be seen from the alignment of the segments v, v, and of the two lamps r and g.

But if the craft is located, say, at the point c, then the deviation from the directrix is automatically indicated by the direction-finder apparatus, in that the segment v of the green lamp has been shifted somewhat toward the right-hand side in relation to the segment v of the red lamp. Hence, the pilot knows that, in order to restore the craft to the steering line or directrix a Sr Sg, he must turn to the right-hand side. Hence, by the aid of the direction-finder outfit furnished with an indicator or signal device as hereinbefore disclosed, in conjunction with two radio beacons, it is possible to keep the craft exactly on the line a Sg Sr without the use of a compass. The application of this invention to marine vessels is especially desirable whenever such vessels are obliged to travel thorugh comparatively narrow channels of water.

Figure 5:
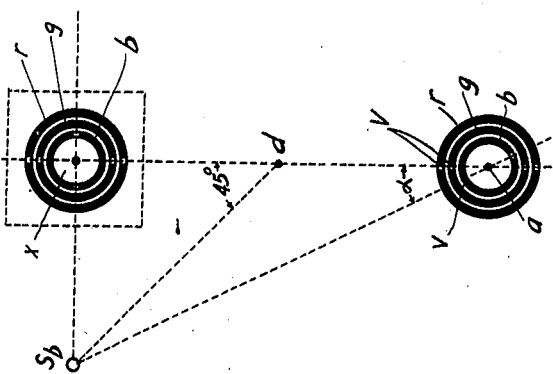

If in addition to the two radio beacons Sr and Sg defining the steering line, there is a third transmitter Sb located laterally with respect to the line Sr Sg (see Fig. 5) then a third lamp, say the blue lamp b may be coordinated thereto in the direction-finder. Then, by the aid of the known distance between the said radio beacon Sb and the landing point x located say at an airport or harbor and the bearing angle α indicated by indicator b it is easily possible to estimate the distance of the craft from the landing place or destination. In this manner it is possible to begin the landing of an aircraft at a definite point as for instance d where the angle α has a certain and definite value, say, 45 degrees, and then to land at the point x where the light picture of the indicator b bears a quadrature relation with respect to the light picture of x and g.

In order that the landing of aircraft may always be effected against the direction of the wind, it is advisable to mount a greater number of radio beacons in the vicinity of the landing place or airport, and of these three are to be in operation in accordane with the direction of the wind prevailing at any given time.

An arrangement of this kind comprises four radio beacons S1, S2, S3, and S4 as indicated in Fig. 6. For instance, if the wind blows in the direction from S1 to S2, then the direction of landing is S1 to x. The radio beacons S1 and S2 and S3, respectively play the part of the radio beacons Sg, Sr, and Sb, respectively, in Fig. 5. The radio beacon S1 is coordinated, for example, to the red lamp of the aircraft direction-finder outfit and is modulated by 500 cycles per second; transmitter S2 to the green lamp and modulated by 700 cycles per second, transmitter S3 to the blue lamp and modulated by 900 cycles per second. The radio beacon S4 is inoperative.

Now, upon the direction of the wind changing into that from S4 to S3, then the radio beacon S2 is disconnected, S4 is connected, and modulated by 500 cycles per second, while the modulating frequencies of radio beacons S1 and S3 are now 700 and 900 cycles per second respectively.

The change-over of the transmitters can be accomplished automatically in dependence upon some suitable device indicatoing the direction of the wind.

I claim:

1. Apparatus for taking bearings from one or more radio beacons comprising a rotatable crossed loop direction finder aerial, a fixed graduated scale, a rotatable optical indicating means located within said scale comprising a plurality of optical indicators radially mounted upon a rotatable support, driving means connecting said aerial and said optical indicators, means for controlling said indicators including a plurality of separate relay resonant circuits interposed between said frame aerial and said indicators, each one of said resonant circuits and each of said indicators having contact elements combined with each relay so as to be controlled by the coordination of the frequencies of a radio beacon.

2. In radio direction finder receiving apparatus comprising a rotatable crossed frame aerial, a receiver having an output circuit combined with said aerial, said output circuit divided into a plurality of separate circuits, each of said separate circuits being responsive to a different frequency, a rotatable disk having angular graduations thereon, a plurality of different colored lamps mounted on said disk, each being arranged on a different radius and connected to different portions of said output circuit so as to correspond to a predetermined frequency, the output of said receiver having each separate circuit being tuned by a separate relay each having a separate diaphragm tuned to respond to a definite frequency and electrical contacts arranged with said colored lamps so as to present a light path of different colors on said scale by means of said lamps with a relatively narrow segment of light to indicate by a definite pattern the position of minimum signal strength received by said receiver.

3. A direction finder receiving device comprising a rotatable cross-looped frame aerial including a fixed graduated scale, a synchronously rotatable optical indicator located within said scale having a plurality of optical indicators radially mounted upon a rotatable support, means for illuminating said indicators including a plurality of separate low frequency resonant circuits having separate relays, each separate relay having a diaphragm and contact member for cooperating with said receiving device to operate the illuminating means of said optical indicators.

4. An aircraft radio receiving device for noting a plurality of landing bearings from a plurality of fixed radio beacons located in the vicinity of an airport, comprising crossed loops having a weather proof covering, a rotatable search coil arranged with rotatable optical indicating means having a plurality of different identifying means and a corresponding number of low frequency resonant circuits having magnetic relays, each magnetic relay having a separate diaphragm and contacting elements arranged to cooperate with said receiving device to illuminate said optical indicating means so that a definite relation between each of the different indicators is established.

5. An aircraft radio receiving device for noting a plurality of landing bearings from a plurality of fixed radio beacons located in the vicinity of an airport, comprising crossed loops having a weather proof covering, a rotatable search coil arranged to be simultaneously rotatable with optical indicating scale having a plurality of different color-identifying means, each optical indicating means arranged to be rotatable in a concentric path of different radii and a corresponding number of low audio frequency resonant circuits having magnetic relays, each relay having a diaphragm and separate contacting elements for cooperating with said receiving device to illuminate said optical indicating means so that a definite relation between the different color indicators is established.

6. In radio direction finder apparatus, the combination of a weatherproof crossed frame aerial having connected therewith a receiver having an output circuit, said output circuit having portions which are resonant to different signal frequencies, a rotatable disk, a plurality of different colored lamps mounted upon said disk, each of said colored lamps being mounted on a different radius and connected to a different portion of said output circuit and driven means for rotating a search coil simultaneously with said disk, identifying means arranged with the contacts of a plurality of separate relays, each relay having a separate diaphragm tuned to respond to a definite frequency, and electrical contacts arranged with said colored lamps so as to present a light path of different color on said disk by means of said lamps with a relatively narrow segment of light to indicate by a definite pattern the position of minimum signal strength received by said receiver.

7. In radio direction finder receiving apparatus, comprising a rotatable aerial, a receiver having an output circuit combined with said aerial, said output circuit divided into a plurality of separate circuits, each of said separate circuits being responsive to a different frequency, a rotatable member having graduations thereon, a plurality of different indicating means mounted upon said rotatable member, each different indicating means arranged on a different radius on said rotatable member and connected to different portions of output circuit so as to correspond to a predetermined frequency, the output of said receiver having each separate circuit tuned to be responsive to separate relay means so as to respond to a definite frequency, and electrical means arranged with said different indicating means so as to present an optical path having different identifying means on said scale to indicate by a definite pattern the position of minimum signal strength received by said receiver.

AUGUST LEIB.